ates Patent [19]

United States Patent [19]

Tseng

[11] 4,400,856
[45] Aug. 30, 1983

[54] CARGO SECURING FITTING

[76] Inventor: Tsiung-Siung Tseng, No. 707, 3-4-28, Sakurazaka, Chuo-ku, Fukuoka-shi, Fukuoka-ken, Japan

[21] Appl. No.: 357,088

[22] Filed: Mar. 11, 1982

[30] Foreign Application Priority Data

Mar. 21, 1981 [JP] Japan .................. 56/42125

[51] Int. Cl.³ ........................................... A44B 17/00
[52] U.S. Cl. .................................. 24/221 R; 24/109; 24/265 CD; 403/348; 410/116
[58] Field of Search ............... 24/221 R, 221 A, 109, 24/265 CD; 410/78, 82, 96, 97, 101, 106; 403/348, 349; 248/505; 410/116

[56] References Cited

U.S. PATENT DOCUMENTS

| 279,568 | 6/1883 | Jarvis | 24/109 |
| 3,367,000 | 2/1968 | Schluter | 24/221 R |
| 3,860,209 | 1/1975 | Strecker | 403/348 |
| 4,125,339 | 11/1978 | Pittinger | 403/348 |

Primary Examiner—Robert Peshock
Assistant Examiner—David Tarnoff
Attorney, Agent, or Firm—Birch, Stewart, Kolasch & Birch

[57] ABSTRACT

An improved cargo securing fitting comprising a base coupling member adapted to be fixed to the floor of a carrier and a cap coupling member removably connected to the base member. The base coupling member includes a plurality of outer spaced coupling lugs projecting radially inwardly of the inner periphery of a socket portion formed therein and a circular central pillar extending upwardly of the socket portion to the same level as the coupling lugs having a plurality of inner spaced coupling lugs projecting radially outwardly of the central pillar in diametrically opposed relationship to the outer coupling lugs. The removable cap coupling member has a circular plug element having a plurality of outer spaced coupling lugs projecting radially outwardly of the outer periphery of the plug element and a circular central recess having a plurality of inner spaced coupling lugs projecting radially inwardly in a diametrically opposed relationship to the outer coupling lugs. The outer and inner coupling lugs on the cap coupling member are arranged to engage the outer and inner coupling lugs on the base coupling member, respectively, by turning the cap coupling member relative to the base coupling member.

3 Claims, 12 Drawing Figures

CARGO SECURING FITTING

BACKGROUND OF THE INVENTION

1. Field of the Invention

This invention relates to a cargo securing fitting adapted to be used for fixing a cargo on the floor of carriers such as cargo ships, vehicles, airplanes or the like. Particularly, the invention relates to such a cargo securing fitting comprising a base coupling member adapted to be secured or welded to the floor of the carrier and a removable cap coupling member connected to the base coupling member and having any one of a stacker cone, twist lock cone, padeye, eyering, cloverleaf cone and the like usable to fasten or lash a solid cargo, such as containers, plants, vehicles or the like on the floor of a carrier, thereby to prevent the cargo from shifting or otherwise collapsing during its transportation. In turn, the cap coupling member can be removed from the base coupling member to make the cargo space floor smooth and free for movement of a bulldozer or operation of a grab, when the load to be transported by the carrier is of bulk cargo, such as coals, ores, grains or other materials.

2. Prior Art

One of conventional cargo securing fittings is of a so-called slide-guide type including a base on which a U-shaped guide member is provided. This fitting has a disadvantage in that lashing means connected to the fitting is apt to slide in the guide member in a direction to be released from the opening of the guide member. Therefore, this known fitting can be merely used as a stacker cone against horizontal shifting force, but of no value to be a securing fitting against vertical force. Japanese patent Laid-Open Publication No. 37781/1976 discloses another cargo securing fitting. As shown in FIGS. 6 and 7 of the accompanying drawings, this fitting comprises a base connector member a having upwardly inwardly projecting flanges b around the edge of the base member, and a insert connector member c having downwardly outwardly projecting lugs d. Each of the flange and lug has an arcuate undercut to define a twisted and tapered engagement surface which corresponds to a portion of an imaginal truncated cone having an apex positioned at a point somewhat deviated from the common center of the base member and insert member.

The base connector member of this type has a relatively large space at the center area thereof. Firstly, its securing strength in vertical direction is insufficient due to relatively small engagement areas of the lugs of insert connector member with the flanges around the edge of the base connector member. Secondly, the flanges are apt to be damaged by bulldozer or grab during cargo operation due to the fact that the flanges of base member are inwardly protruded towards the large central space. Another disadvantage of the cargo securing fitting of this type resides in that difficult and costy machining operations are required to form the eccentrical twisted taper engagement surfaces on the flanges and lugs.

OBJECTS AND SUMMARY OF THE INVENTION

It is, therefore, a primary object of this invention to provide a channel type cargo securing fitting capable of eliminating the aforementioned disadvantages.

Another object of this invention is to provide a cargo securing fitting comprising a base coupling member which is sufficiently strong to resist an external impact force to be applied thereto when a cap coupling member is disconnected from the base coupling member.

A further object of this invention is to provide a cargo securing fitting capable of increasing effectively anti-shearing and anti-tension forces between the base coupling member and the cap coupling member in an interconnected relationship.

According to this invention, there is provided an improved cargo securing fitting comprising a base coupling member having a circular socket portion therein, and including a plurality of outer spaced coupling lugs projecting radially inwardly of the inner periphery of the socket portion and a circular central pillar extending upwardly of the socket portion to the same level as the coupling lugs to define a substantially annular channel between the central pillar and the inner periphery of the socket portion, said central pillar being provided with a plurality of inner spaced coupling lugs projecting radially outwardly of the central pillar in diametrically opposed relationship to the outer coupling lugs; and a removable cap coupling member having a circular plug element projecting downwardly thereof, said plug element including a plurality of outer spaced coupling lugs projecting radially outwardly of the outer periphery of the plug element and a circular central recess formed in the plug element on its lower surface to define an annular projection for receiving in said annular channel, said central recess being provided with a plurality of inner spaced coupling lugs projecting radially inwardly of the periphery of the central recess in diametrically opposed relationship to the outer coupling lugs, said outer and inner coupling lugs on the cap coupling member being arranged to engage the outer and inner coupling lugs on the base coupling member, respectively, by turning the cap coupling member relative to the base coupling member when the annular projection on the plug element is in the annular channel in the base coupling member.

Preferably, each of the outer coupling lugs on the base coupling member is provided with an inwardly inclined arcuate surface for engaging a corresponding inclined arcuate surface of the outer coupling lug on the plug element while each of the inner coupling lugs on the central pillar is provided with an outwardly inclined arcuate surface for engaging a corresponding inclined arcuate surface of the inner coupling lug in the central recess. The inclined arcuate surfaces of the outer and inner lugs on each of the base coupling member and the cap coupling member are of imaginal truncated cones having their apexes on a vertical axis of the central pillar.

Preferably, the base coupling member is provided with positioning grooves formed therein near the two adjacent outer coupling lugs thereon. At least one stopper pin is mounted on the cap coupling member on its lower surface in a position diametrically opposite to the outer coupling lug on the cap coupling member to co-operate with one of the possitioning grooves, thereby restricting rotation of the cap coupling member relative to the base coupling member to a position in which the outer and inner coupling lugs on the capmember engage the outer and inner coupling lugs on the base member, respectively.

Other objects and advantages of this invention will be become apparent from the following description of the invention made with reference to the accompanying drawings, in which;

FIGS. 6 and 7 are schematic views showing a prior art fitting in which FIG. 6 is a perspective view showing a deck socket and a cap member in their disconnected position and FIG. 7 is a sectional view of the fitting in its connected position.

DESCRIPTION OF THE PREFERRED EMBODIMENT

Figure 1:
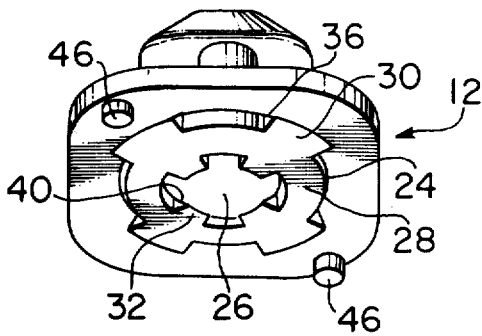
FIG. 1 is a perspective view of a cargo securing fitting of the invention showing a base coupling member and a cap coupling member in their disconnected position.
Figure 1:
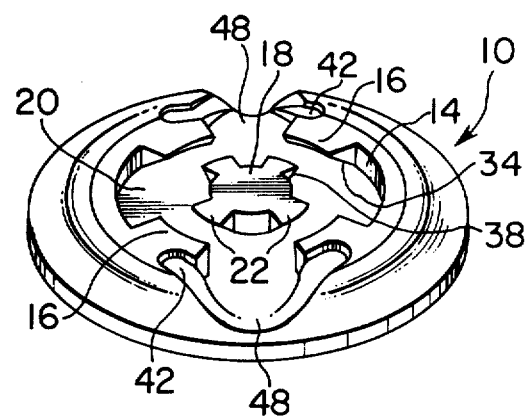
Figure 2:
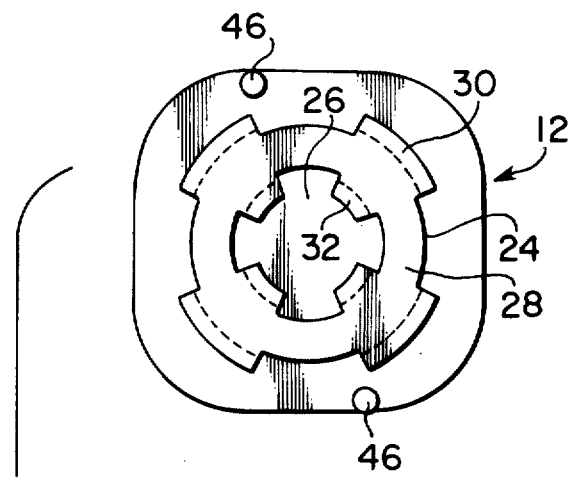
FIG. 2 is a plan view showing the top of the base coupling member and the bottom of the cap coupling member as shown in FIG. 1 respectively.
Figure 2:
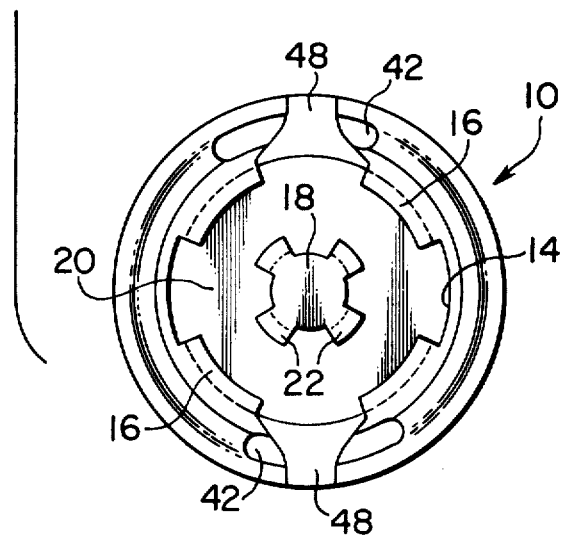
Figure 3:
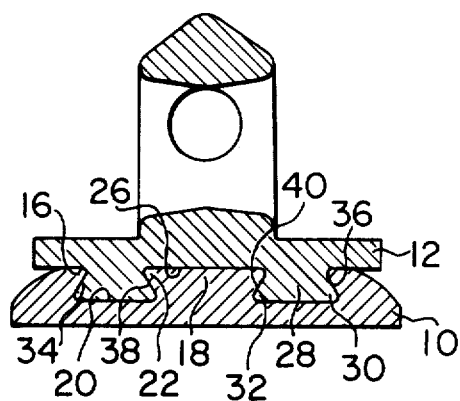
FIG. 3 shows a vertical section of the fitting according to the invention in a connected position.

Referring now to FIGS. 1 to 3, a channel type cargo securing fitting according to this invention comprises a base coupling member 10 adapted to be welded or otherwise fixedly mounted on a floor of a carrier and a cap coupling member 12 removably connected to the base coupling 10.

The base coupling member 10 has a circular socket portion 14 opening upwardly thereof and is provided with a plurality of circumferentially spaced outer coupling lugs 16 projecting radially inwardly of the periphery of the socket portion 14. A central piller 18 is formed on the socket portion 14 and extends upwardly thereof to the same level as the outer coupling lugs 16 to define an annular channel 20 between the central pillar 18 and the periphery of the socket portion 14. A plurality of circumferentially spaced inner coupling lugs 22 are formed on the central pillar 18 in a diametrically opposed relationship to the outer coupling lugs 16.

The cap coupling member 12 is provided with a plug element 24 projecting downwardly of the lower surface thereof. A circular central recess 26 is formed in the plug element 24 on its lower surface to fit over the central pillar 18 on the base coupling member 10 and to define an annular projection 28 between the central recess 26 and the periphery of the plug element 24 for receiving in the annular channel 20 in the base coupling member. A plurality of outer spaced coupling lugs 30 are formed on the plug element 24 to cooperate with the outer coupling lugs 16 on the base coupling element 10. The plug element 24 is provided with a plurality of inner spaced coupling lugs 32 projecting inwardly of the periphery of the central recess 26 in a diametrically opposed relationship to the outer coupling lugs 30 on the plug element 24 to cooperate with the inner coupling lugs 22 on the central pillar 18. Each of the outer coupling lugs 16 has an inwardly inclined arcuate surface 34 thereon which engages a corresponding inclined arcuate surface 36 of the outer coupling lug 30 on the cap coupling member 12. Each of the inner coupling lugs 22 is provided with an outwardly inclined arcuate surface 38 which engages a corresponding inclined arcuate surface 40 of the inner coupling lug on the cap coupling member 12. The inclined arcuate surfaces 34, 36 and 38, 40 of the coupling lugs are of imaginal truncated cones having their apexes on a vertical axis of the central pillar 18.

The cap coupling member 12 is positioned on the base coupling member 10 with each of the coupling lugs 30 and 32 on the plug element 24 alined with a space between the adjacent coupling lugs on the base coupling member 10 so that the annular projection 28 of the plug element 24 is received in the annular channel 20 in the base coupling member 10. Then, the cap coupling member 12 is rotated around the axis of the pillar 18 relative the base coupling member 10 either clockwise or counterclockwise. This rotation of the cap coupling member 12 relative to the base coupling member 10 causes the outer and inner coupling lugs 30 and 32 to engage the outer and inner coupling lugs 16 and 22, respectively, thereby bringing the inclined arcuate surfaces 36 and 34 and 40 and 38 into contact with one another.

Preferably, stop means is provided for restricting the rotation of the cap coupling member 12 relative to the base coupling member 10 to a position in which the outer and inner coupling lugs 30 and 32 engage the corresponding adjacent outer and inner coupling lugs 16 and 22, respectively. The stop means comprises two diametrically opposite arcuate grooves 42 formed in the base coupling member 10 on its upper surface adjacent the two adjacent outer coupling lugs 16 and 16 and stopper pin 46 cooperating with each of the arcuate grooves 42. Thus, the rotation of the cap coupling member 12 is stopped by abutment of the stopper pins 46 against the extreme ends of the arcuate grooves 42.

Figure 4A:
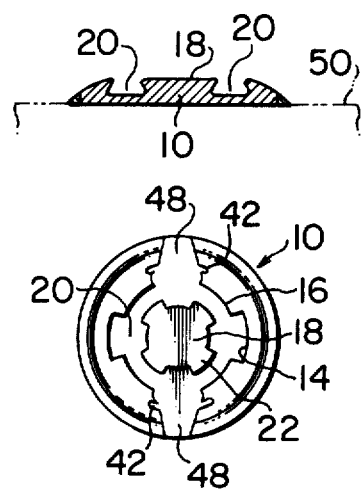
FIG. 4A shows the base coupling member in plane and also in section the base member being welded to the surface of a floor of a carrier.
Figure 4B:
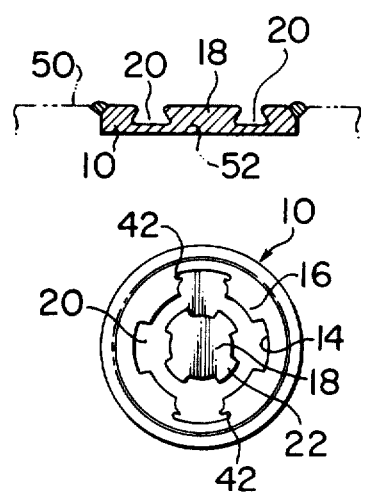
FIG. 4B shows a base member according to another embodiment of the invention in plan and also in section, the base member being embedded in a floor of a carrier with the top thereof coplanar with the surface of the floor.

Two diametrically opposite drain notches 48 are formed in the base coupling member 10 and extend outwardly from the socket portion across the arcuate grooves 42 to facilitate removal of water which otherwise would be trapped in the socket portion. The base coupling member 10 with the drain notches 48 is welded to the floor 50 of the carrier on the surface thereof as shown in FIG. 4A. In case that as shown in FIG. 4B, a base coupling member 10 is fixedly embedded in a recess 52 formed in the floor 50 of the carrier, there are no drain notches provided in the base coupling member 10.

Figures 5A, 5B, 5C:
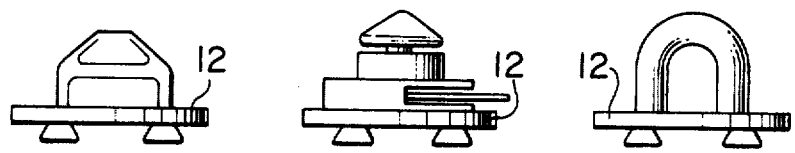
FIGS. 5A to 5E are sectional views showing various types of cap coupling members adapted to be used with the base coupling member.
Figures 5D, 5E:
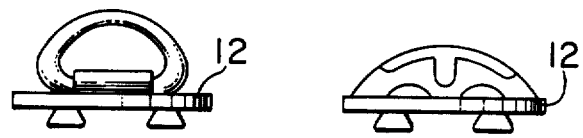
Figure 6:
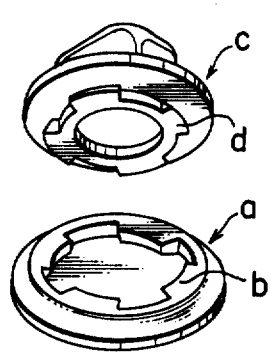
Figure 7:
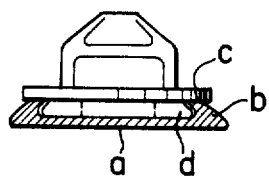

Mounted on the cap coupling member 12 is means usable to fasten or lash a solid cargo, such as a container, plant, vehicle or the like to the carrier. FIGS. 1, 3 and 5A show the cap coupling member which is provided with a stacker cone extending upwardly from the top thereof. FIG. 5B show a cap member with a twist lock cone, FIG. 5C a cap member with a padeye, FIG. 5D a cap member with an eyering, and FIG. 5E a cap member with a cloverleaf cone.

As will be noted from the foregoing, when it is desired to load a cargo space of the carried with solid cargos, each cap coupling member 12 is connected to the base coupling member 10 fixed on the floor of the cargo space in a manner as set forth above. According to this invention, engagement of the outer and inner coupling lugs on the base member with the outer and inner coupling lugs on the cap member, respectively enables higher tensile force to apply to the cap coupling member in fastening or lashing the solid cargo to the cargo carrier.

It is required to remove the cap coupling member 12 from the base coupling member 10 in a reverse phase prior to loading the cargo space with bulk cargo, such as coals, ores, grains or other bulk materials using a bulldozer or a grab. Thus the base coupling member 10 is exposed to the cargo space by disconnecting the cap member 12 therefrom so that the exposed base coupling member may encounter the bulldozer or grab during loading or unloading operation of the bulk cargo. When an impact force is applied to the base coupling member 10 by the bulldozer or grab, it will be received by the central pillar as well as the edge of the base member around the socket portion. The simultaneous application of the impact force to the central pillar and the edge of the base member makes it possible to avoid any damage of the coupling lugs on the base coupling member. In other words, the central pillar serves to prevent the impact force from being locally applied to the edge of the base coupling member, which would damage one or more outer coupling lugs on the base member.

Although the embodiments of this invention have been described with reference to the drawings, many modifications and changes can be made by those stilled in the art on the basis of the principle of the invention without departing from the spirit and scope of the invention.

What is claimed is:

1. A cargo securing fitting comprising a base coupling member having a circular socket portion therein and, said circular socket portion including a plurality of outer spaced base coupling lugs projecting radially inwardly of the inner periphery of said socket portion and a circular central pillar extending upwardly of said socket portion to the same level as said base coupling lugs to define a substantially annular channel between said central pillar and the inner periphery of said socket portion, said central pillar being provided with a plurality of inner spaced base coupling lugs projecting radially outwardly of said central pillar in diametrically opposed relationship to said outer base coupling lugs; and a removable cap coupling member having a circular plug element projecting downwardly thereof, said plug element including a plurality of outer spaced cap coupling lugs projecting radially outwardly of the outer periphery of said plug element and a circular central recess formed in said plug element on its lower surface to define an annular projection for receiving in said annular channel, said central recess being provided with a plurality of inner spaced cap coupling lugs projecting radially inwardly of the periphery of said central recess in diametrically opposed relationship to said outer cap coupling lugs, said outer and inner coupling lugs on said cap coupling member being arranged to engage said outer and inner cap coupling lugs on said base cap coupling member, respectively, by turning said cap coupling member relative to said base coupling member either clockwise or counterclockwise when said annular projection on said plug element is in said annular channel in said base coupling member.

2. A cargo securing fitting as claimed in claim 1 wherein each of said outer base coupling lugs on said base coupling member is provided with an inwardly inclined arcuate surface for engaging a corresponding inclined arcuate surface of said outer base coupling lug on said plug element while each of said inner base coupling lugs on said central pillar is provided with an outwardly inclined arcuate surface for engaging a corresponding inclined arcuate surface of said inner cap coupling lugs in the central recess, said inclined arcuate surfaces of said outer and inner lugs on each of said base coupling member and said cap coupling member are of imaginal truncated cones having their apexes on a vertical axis of said central pillar.

3. A cargo securing fitting as claimed in claim 1 wherein said base coupling means is provided with positioning arcuate grooves formed therein near said two adjacent outer base coupling lugs thereon, and at least one stopper pin is mounted on said cap coupling member on its lower surface in a position diametrically opposite to said outer cap coupling lug on said cap coupling member to cooperate with one of said positioning arcuate grooves, thereby restricting rotation of said cap coupling member relative to said base coupling member to a position in which said outer and inner cap coupling lugs on the cap member engage said outer and inner base coupling lugs on said base member, respectively.

* * * * *